(12) United States Patent
Hayashi

(10) Patent No.: US 9,457,711 B2
(45) Date of Patent: Oct. 4, 2016

(54) LIGHT SOURCE UNIT FOR VEHICLE AND VEHICULAR INTERIOR PART HAVING THE SAME

(75) Inventor: Nobuki Hayashi, Toyota (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 920 days.

(21) Appl. No.: 13/470,585

(22) Filed: May 14, 2012

(65) Prior Publication Data

US 2013/0003404 A1    Jan. 3, 2013

(30) Foreign Application Priority Data

Jun. 28, 2011   (JP) .................................. 2011-142810

(51) Int. Cl.
*B60Q 3/00* (2006.01)
*B60Q 3/02* (2006.01)

(52) U.S. Cl.
CPC ............... *B60Q 3/004* (2013.01); *B60Q 3/022* (2013.01); *B60Q 3/0223* (2013.01); *B60Q 3/0233* (2013.01)

(58) Field of Classification Search
CPC ........ B60Q 3/004; B60Q 1/323; B60Q 1/50; B60Q 3/0296; B60Q 3/0216; B60Q 3/0293; B60Q 2500/10; B60Q 3/0279; B60Q 3/002; B60Q 3/044; B60Q 1/2669; B60Q 2400/10; B60Q 2900/10; B60Q 3/005; B60Q 3/02; B60Q 1/2661; H01H 2009/183; H01H 9/182; H01H 21/025; H01H 2219/062; F21V 33/00; F21V 19/04; B60N 3/14; B60R 11/0264; B60R 1/04; B60R 13/0243; B62J 6/00; F21Y 2101/02; F21S 48/215; F21S 48/2268; F21S 48/1241; F21S 48/115; F21K 9/30; F21K 9/52
USPC ...... 362/23.04, 487, 544; 200/317; 219/267, 219/269; 296/24.34, 70; 340/425.5, 426.28
See application file for complete search history.

(56) References Cited

U.S. PATENT DOCUMENTS

| | | | | |
|---|---|---|---|---|
| 5,548,492 A | * | 8/1996 | Hansen | .................. B60J 3/0282 296/97.2 |
| 6,254,261 B1 | * | 7/2001 | Bingle et al. | .................. 362/501 |
| 2003/0185017 A1 | * | 10/2003 | Ishida et al. | .................. 362/539 |
| 2006/0187659 A1 | * | 8/2006 | Nawashiro | ..................... 362/234 |

FOREIGN PATENT DOCUMENTS

| JP | 9-086273 | 3/1997 |
|---|---|---|
| JP | 2010-83211 | 4/2010 |

OTHER PUBLICATIONS

Japanese Office action dated Aug. 26, 2014, along with an English-language translation thereof.
Chinese Office Action, dated Apr. 25, 2014, along with English-language translation thereof.

* cited by examiner

*Primary Examiner* — Stephen F Husar
*Assistant Examiner* — Danielle Allen
(74) *Attorney, Agent, or Firm* — Greenblum & Bernstein, P.L.C.

(57) ABSTRACT

A light source unit for a vehicle includes a light source body, a light guide member that guides and exits the light from the light source body toward a portion of the vehicle to be illuminated, and a cover member housing the light source body and the light guide member. The cover member has an elongated light exit portion through which light from the light guide member is exited to the portion to be illuminated. The light exit portion includes a first light exit portion and at least two second light exit portions arranged along a longitudinal direction of the light exit portion to sandwich the second light exit portion therebetween. Light from the light guide member directly reaches the portion to be illuminated via the first light exit portion and light from the light guide member indirectly reaches the portion to be illuminated via the second light exit portion.

19 Claims, 8 Drawing Sheets

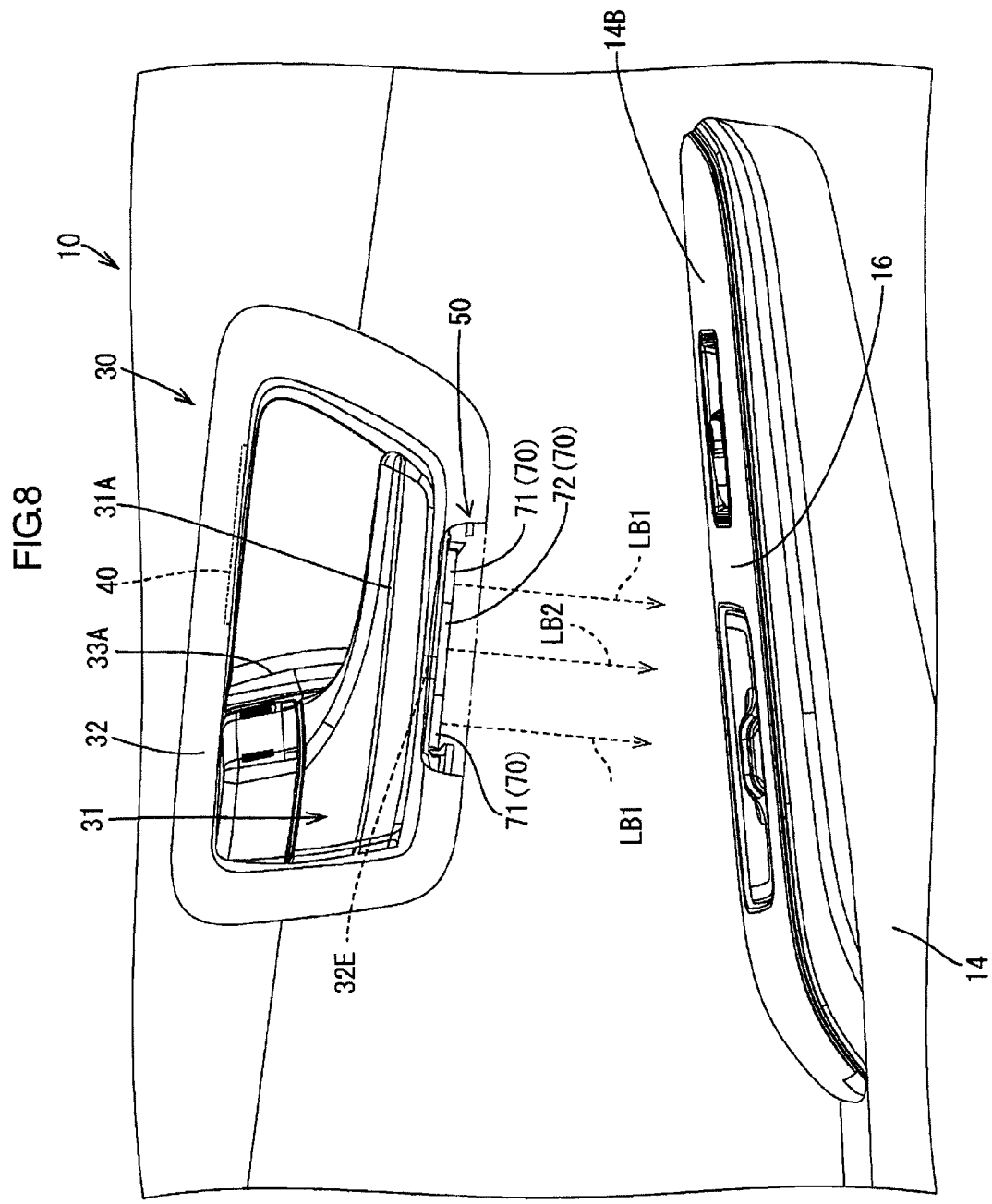

LIGHT SOURCE UNIT FOR VEHICLE AND VEHICULAR INTERIOR PART HAVING THE SAME

CROSS REFERENCE TO RELATED APPLICATION

This application claims priority from Japanese Patent Application No. 2011-142810 filed on Jun. 28, 2011. The entire contents of the priority application are incorporated herein by reference.

FIELD OF THE INVENTION

The present disclosure relates to a light source unit for a vehicle and a vehicular interior part having the same.

BACKGROUND OF THE INVENTION

A light source unit is provided to a vehicular door trim (a vehicular interior part) to illuminate a certain area or a certain portion such as an armrest. For example, published patent application JP-A-9-86273 discloses a light source unit that is provided on an upper side of the armrest to illuminate the armrest. Thus, the light source unit illuminates the armrest and accordingly, switches provided on the armrest are easily recognized.

To illuminate an elongated area or an elongated portion such as an armrest, the light source unit may include an elongated light exit portion to exit light therefrom over an elongated area. In such a case, if the amount of rays of light exited from the light source unit changes along the longitudinal direction of the light exit portion, brightness unevenness occurs in the illuminated area or portion and this deteriorates visibility or design.

SUMMARY OF THE INVENTION

The present invention has been made in view of the aforementioned circumstances. An objective of the present invention is to provide a light source unit for a vehicle that provides an equal amount of rays of light exited from a light exit portion in a longitudinal direction of the light exit portion. Another objective of the present invention is to provide a vehicular interior part having such a light source unit.

A technology described herein relates to a light source unit for a vehicle illuminating a portion of the vehicle. The light source unit includes a light source body, a light guide member, and a cover member. The light guide member is configured to guide light from the light source body and exit the light toward the portion of the vehicle that is to be illuminated. The cover member is configured to house the light source body and the light guide member and has an elongated light exit portion through which light from the light guide member is exited to the portion that is to be illuminated. The light exit portion includes a first light exit portion and a second light exit portion, and light exited from the light guide member directly reaches the portion to be illuminated via the first light exit portion, and light exited from the light guide member indirectly reaches the portion to be illuminated via the second light exit portion. The first light exit portion includes at least two first light exit portions that are arranged along a longitudinal direction of the light exit portion. The second light exit portion is provided between the two first light exit portions.

BRIEF DESCRIPTION OF THE DRAWINGS

FIG. 8 is an enlarged view of a part of the door trim close to a switch base in FIG. 1.

DETAILED DESCRIPTION OF THE PREFERRED EMBODIMENTS

One embodiment will be explained with reference to FIGS. 1 to 8. A vehicular door trim 10 (a vehicular interior part) is an interior part that is to be mounted to an inner panel on its compartment inner side. The door trim 10 and the inner panel configure a vehicular door.

Figure 1:
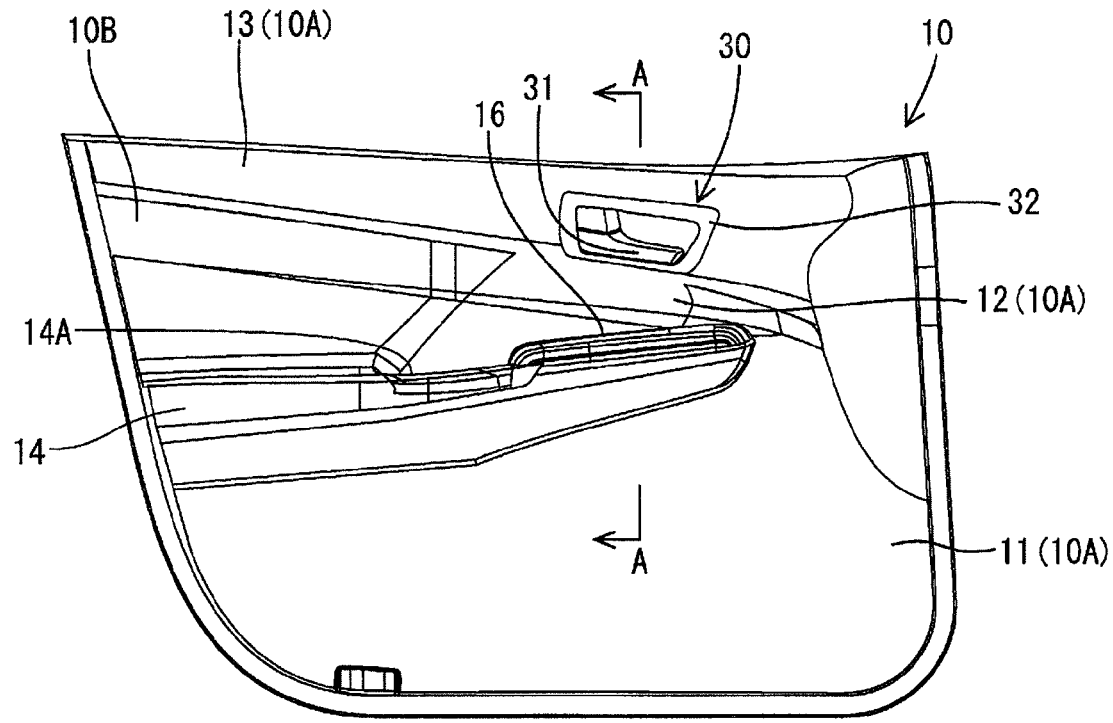
FIG. 1 is a front view of a vehicular door trim having a light source unit for a vehicle according to a first embodiment.

The door trim 10 improves visual quality and comfort of a vehicle compartment. The door trim 10 includes a trim board 10A and an ornament 10B attached to the trim board 10A. As illustrated in FIG. 1, the trim board 10A includes a lower board 11, a middle board 12 and an upper board 13. The lower board 11 configures a lower portion of the trim board 10A. The middle board 12 configures a middle portion of the trim board 10A. The upper board 13 configures an upper portion of the trim board 10A. The trim board 10A may not be configured by separate boards 11, 12, 13 but may be configured by one part that is integrally formed.

Each of the lower board 11, the middle board 12 and the upper board 13 is formed from a synthetic resin such as polypropylene or a material obtained by mixing a synthetic resin and natural fibers (such as kenaf fibers). A skin 15 (see FIG. 3) is adhered to a part or an entire area of a vehicle compartment inner side of the door trim 10.

The boards 11, 12, 13 are connected to each other in a following method, for example. A mounting boss (not illustrated) is provided on one board and a mounting hole (not illustrated) is formed in another board, and the mounting boss is inserted to the mounting hole. Then, a distal end portion of the mounting boss is welded by welding means such as welding by ultrasonic waves. The boards 11, 12, 13 may be connected to each other by various connecting methods using screws or projection fitting.

As illustrated in FIG. 1, the middle board 12 includes an armrest 14 that is used as an armrest for a passenger. The armrest 14 is projected to an inner side of the vehicle compartment. An opening 14A is formed on an upper surface of the armrest 14 so as to be open upwardly. A pull handle (not illustrated) is provided in the opening 14A. A passenger puts his/her fingers in the pull handle to open and close the vehicular door.

An inside handle housing portion 30 is provided on a portion of the upper board 13 close to a connecting portion with the middle board 12. A handle portion 31A (a holding portion) of the inside handle 31 is housed in the inside handle housing portion 30. The handle portion 31A is operated to open and close the vehicular door. An elongated switch base 16 (a switch operation portion) is provided on a portion of the upper surface 14B of the armrest 14 that is located on a lower side of the inside handle housing portion 30.

Figure 2:
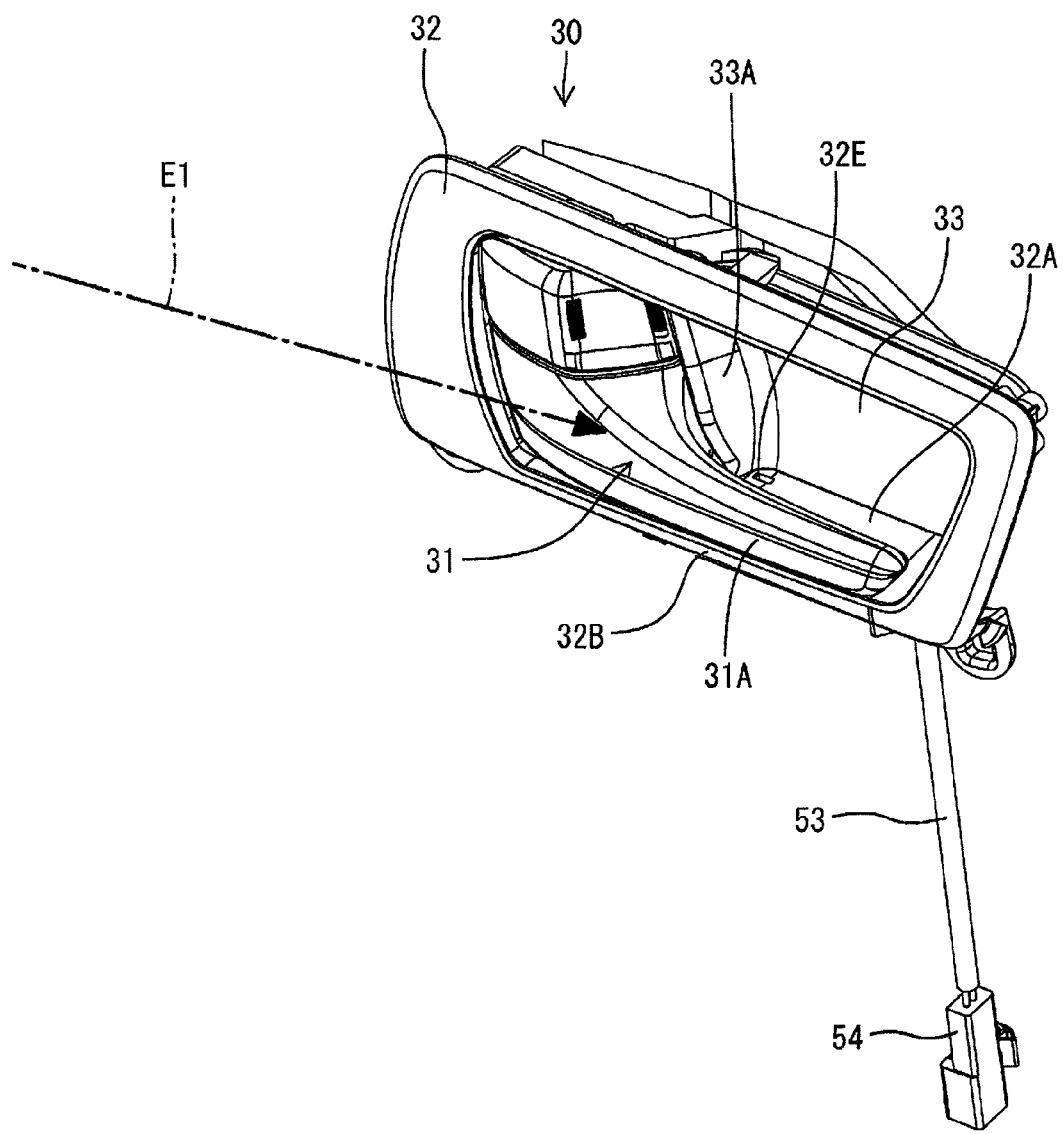
FIG. 2 is a perspective view of an inside handle of FIG. 1.

As illustrated in FIG. 2, the inside handle housing portion 30 mainly includes an inside handle bezel 32 and an inside handle cover 33. In the following, the inside handle bezel 32 will be referred to as a bezel 32.

Figure 3:
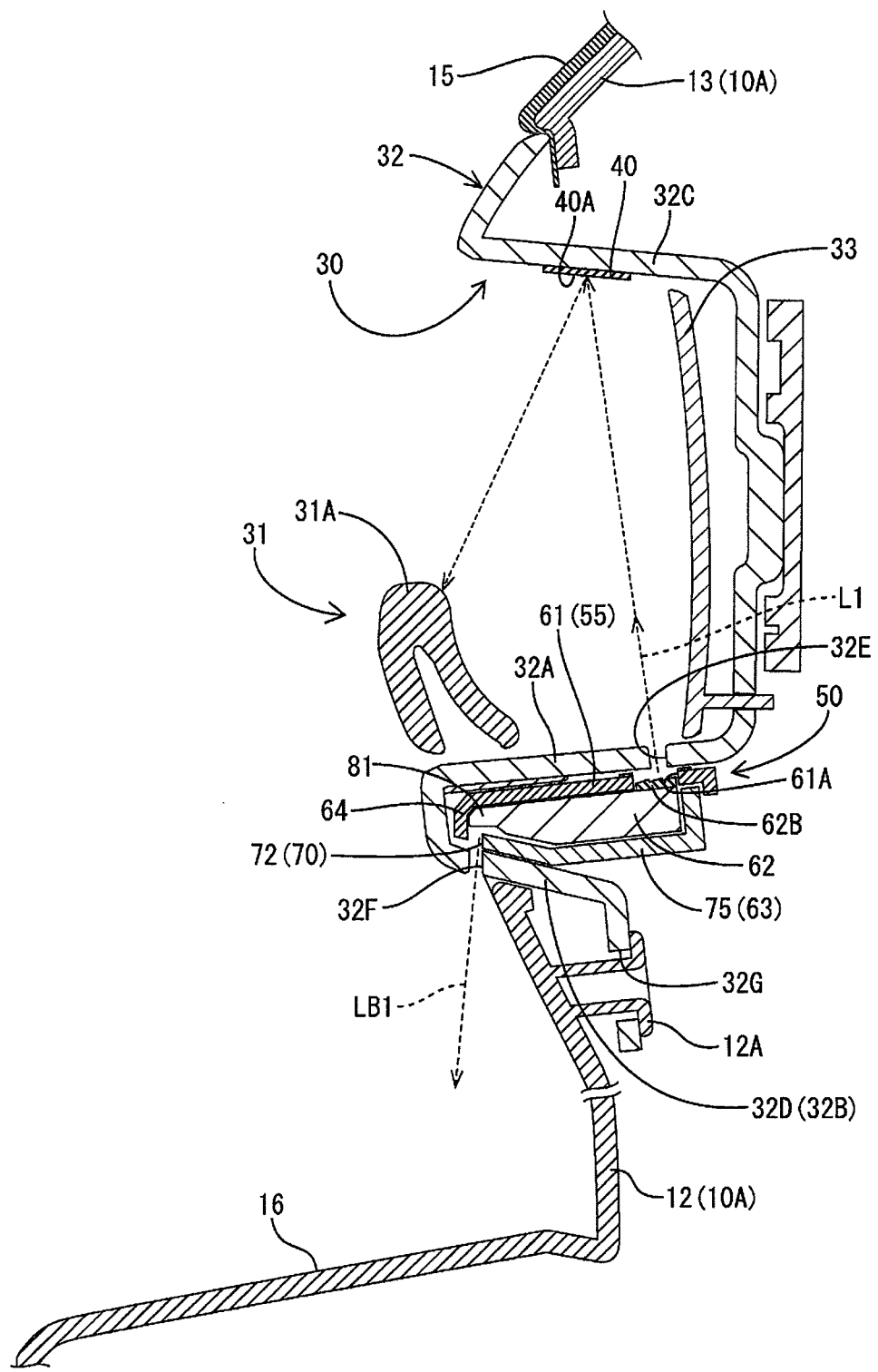
FIG. 3 is a cross-sectional view of the light source unit for a vehicle taken along an A-A line in FIG. 1.

As illustrated in FIGS. 2 and 8, the bezel 32 is formed in substantially a rectangular shape with a front view and to be open toward the inner side of the vehicle compartment. As illustrated in FIG. 3, the inside handle cover 33 is provided to cover an inner wall of the bezel 32 from the inner side of the vehicle compartment. The bezel 32 includes a bezel lower wall portion 32A, an extended portion 32B and a bezel upper wall portion 32C. The extended portion 32B extends from an end portion of the bezel lower wall portion 32A so as to cover a side and a lower portion of a light source unit 50.

As illustrated in FIG. 3, a mounting hole 32G is formed at a lower end portion of the extended portion 32B. A mounting boss 12A that projects from the middle board 12 is inserted to the mounting hole 32G. After the mounting boss 12A is inserted to the mounting hole 32G, the projection end of the mounting boss 12A is welded by ultrasonic waves. Accordingly, the extended portion 32B of the bezel 32 is connected to the middle board 12.

The light source unit 50 of the present embodiment is housed in a space (a housing portion) surrounded by the bezel lower wall portion 32A and the extended portion 32B. The light source unit 50 illuminates the inside handle housing portion 30 and the switch base 16. A configuration of the light source unit 50 will be explained in detail later.

As illustrated in FIGS. 2 and 3, a bezel upper side light exit hole 32E is formed in the bezel lower wall portion 32A (on an upper side of the light source unit 50). The light exit hole 32E is a through hole. Light exited from the light source unit 50 is exited to an inner space of the side handle housing portion 30 through the light exit hole 43E. A lower portion of the extended portion 32B (on a lower side of the light source unit 50) is an inclined portion 32D that is inclined upwardly toward the inner side of the vehicle compartment.

A bezel lower side light exit hole 32F (an illumination portion) is formed in the inclined portion 32D. The light exit hole 32F is a through hole and formed to be open toward the switch base 16 (a portion to be illuminated). The light exited from the light source unit 50 passes (is guided) through the light exit hole 32F downwardly to the switch base 16. The light exit hole 32F is formed in the inclined portion 32D that is inclined upward toward the inner side of the vehicle compartment. Therefore, the light exit hole 32F is not seen by a passenger from the upper side and the design is not deteriorated.

In the present embodiment, the light from the light source unit 50 is exited through the light exit hole 32E and the light source unit 50 illuminates the inner space of the inside handle housing portion 30. The light from the light source unit 50 is exited through the light exit hole 32F and the light source unit 50 illuminates the switch base 16 that is provided on a lower side of the light exit hole 32F.

In the present embodiment, as illustrated in FIGS. 2 and 3, the light exit hole 32E is provided in the bezel lower wall portion 32A of the bezel 32 and on an outer side of the vehicle compartment than the handle portion 31A of the inside handle 31. As illustrated in FIG. 2, the inside handle cover 33 includes a projected portion 33A that projects to the inner side of the vehicle compartment. As illustrated in FIG. 2, the projected portion 33A is provided on a vehicle rear side (a left side in FIG. 2) from the light exit hole 32E. Accordingly, the light exited through the light exit hole 32E to the vehicle rear side is blocked by the projected portion 33A.

With such a configuration, among the light exited from the light exit hole 32E, a part of the light directed to the opening side (the inner side of the vehicle compartment) of the inside handle housing portion 30 is blocked by the handle portion 31A of the inside handle 31 and the projected portion 33A (a blocking portion). From a passenger's view (a line of passenger's sight E1 in FIG. 2), the light exit hole 32E is not seen due to the projected portion 33A and the handle portion 31A of the inside handle 31.

This prevents a passenger from directly seeing the light exit hole 32E (and the light exited therefrom). Accordingly, a passenger does not feel brightness of the light and the design is improved. Generally, eyes of a passenger who is seated are located on the vehicle rear side from the inside handle housing portion 30. Therefore, in the present embodiment, the projected portion 33A is provided at the vehicle rear side from the light exit hole 32E. The projected portion 33A is preferably provided closer to the light exit hole 32E such that a passenger is less likely to see the light exit hole 32E from the vehicle rear side.

In the present embodiment, the inside handle housing portion 30 is illuminated with the light exited upwardly from the light source unit 50. Normally, the eyes of a passenger who is seated are located on an upper side than the inside handle housing portion 30. Therefore, the light exited upwardly from the light source unit 50 is easier to be seen by the passenger than the light exited downwardly. In the present embodiment, the light exited upwardly is blocked by the handle portion 31A of the inside handle 31 and the projected portion 33A. In the present embodiment, even if the light exit hole 32E is provided in the bezel lower wall portion 32A (on a lower surface) of the inside handle housing portion 30, a passenger is less likely to directly see the light exit hole 32E (or the light exited therefrom).

As illustrated in FIG. 3, a light reflection portion 40 is provided on the upper wall 32C of the bezel 32 (an upper wall forming the inside handle housing portion). The light reflection portion 40 reflects the light exited upwardly from the light exit hole 32E and reaching the light reflection portion 40 (represented by an arrow L1 in FIG. 3) toward the inside handle 31 (the handle portion 31A). Accordingly, the handle portion 31A is illuminated from an upper side and can be recognized and seen easily by a passenger.

The light reflection portion 40 is a member having a color that is excellent in light reflectivity such as white. For example, a white tape may be used as the light reflection portion 40. The light reflection portion 40 may be formed by coating a part of the upper wall 32C with paint having excellent light reflectivity (such as white paint).

The light reflection portion 40 is formed in a rectangular shape with a plan view. As illustrated in FIG. 8, the light reflection portion 40 is extended in a direction in which the handle portion 31A of the inside handle 31 extends (in a vehicle front-and-rear direction, in a right-and-left direction in FIG. 8). The light reflection portion 40 is provided between the handle portion 31A and the light exit hole 32E with a plan view. The light reflection portion 40 is located on a vehicle outer side from the inside handle 31.

In the present embodiment, as illustrated in FIG. 3, the upper wall 32C of the bezel 32 is formed in an inclined portion that inclines upwardly toward the inner side of the vehicle compartment. Therefore, a reflection surface 40A (a surface) of the light reflection portion 40 is also an inclined surface that inclines upwardly toward the inner side of the vehicle compartment. The light reflected by the light reflection portion 40 is surely directed to the handle portion 31A.

As illustrated in FIGS. 2 and 8, the light reflection portion 40 is provided on a vehicle front side (on a right side in FIG. 8) from the light exit hole 32E. Accordingly, the light exited from the light exit hole 32E is reflected toward the vehicle front side. Therefore, the reflected light is less likely to reach the passenger's eyes that are located on a vehicle rear side from the inside handle housing portion 30. In FIG. 8, the light exit hole 32E and the light reflection portion 40 are illustrated by a two-dot-chain line.

Figure 5:
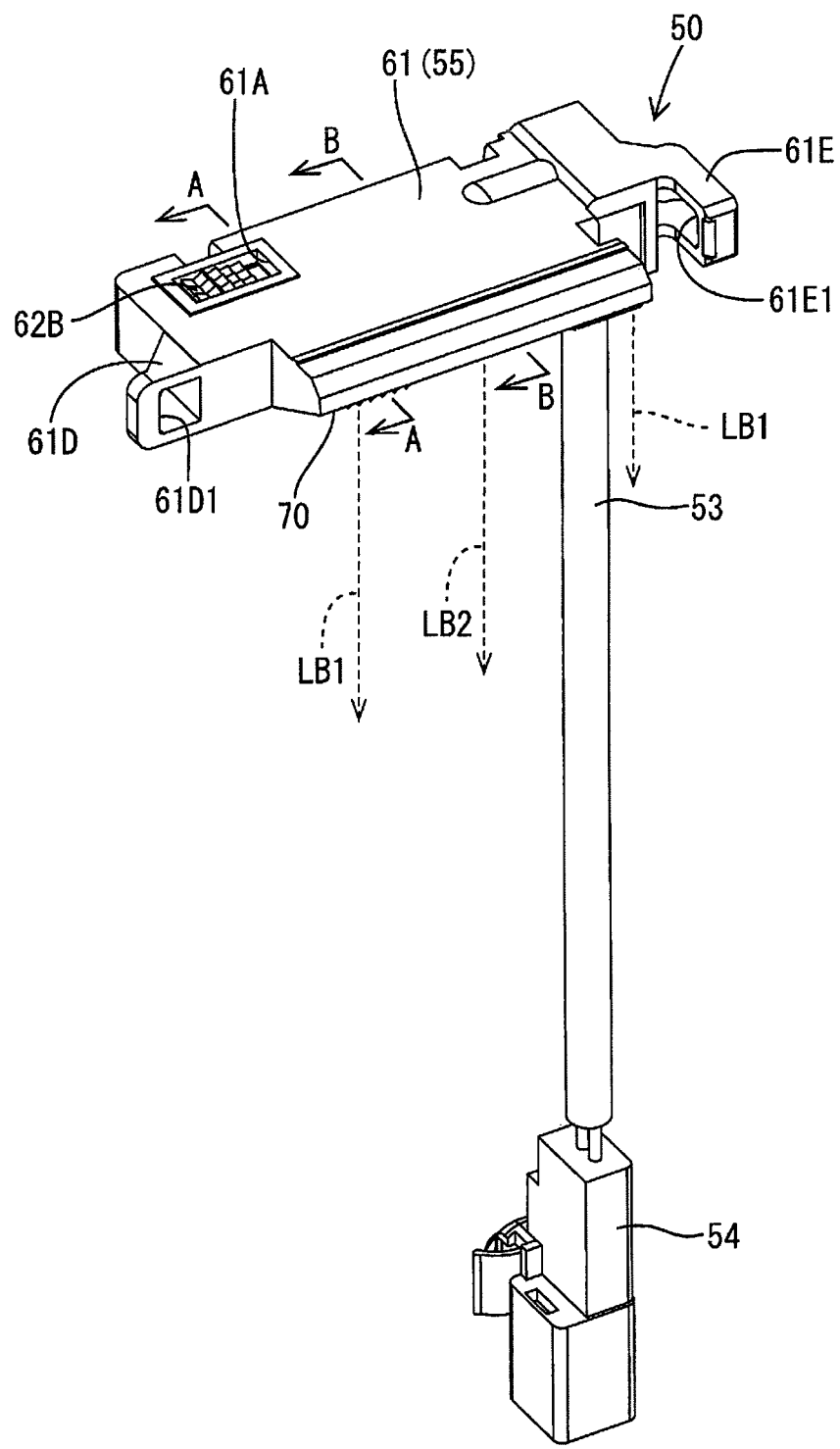
FIG. 5 is a perspective view of the light source unit for a vehicle in FIG. 3.
Figure 6:
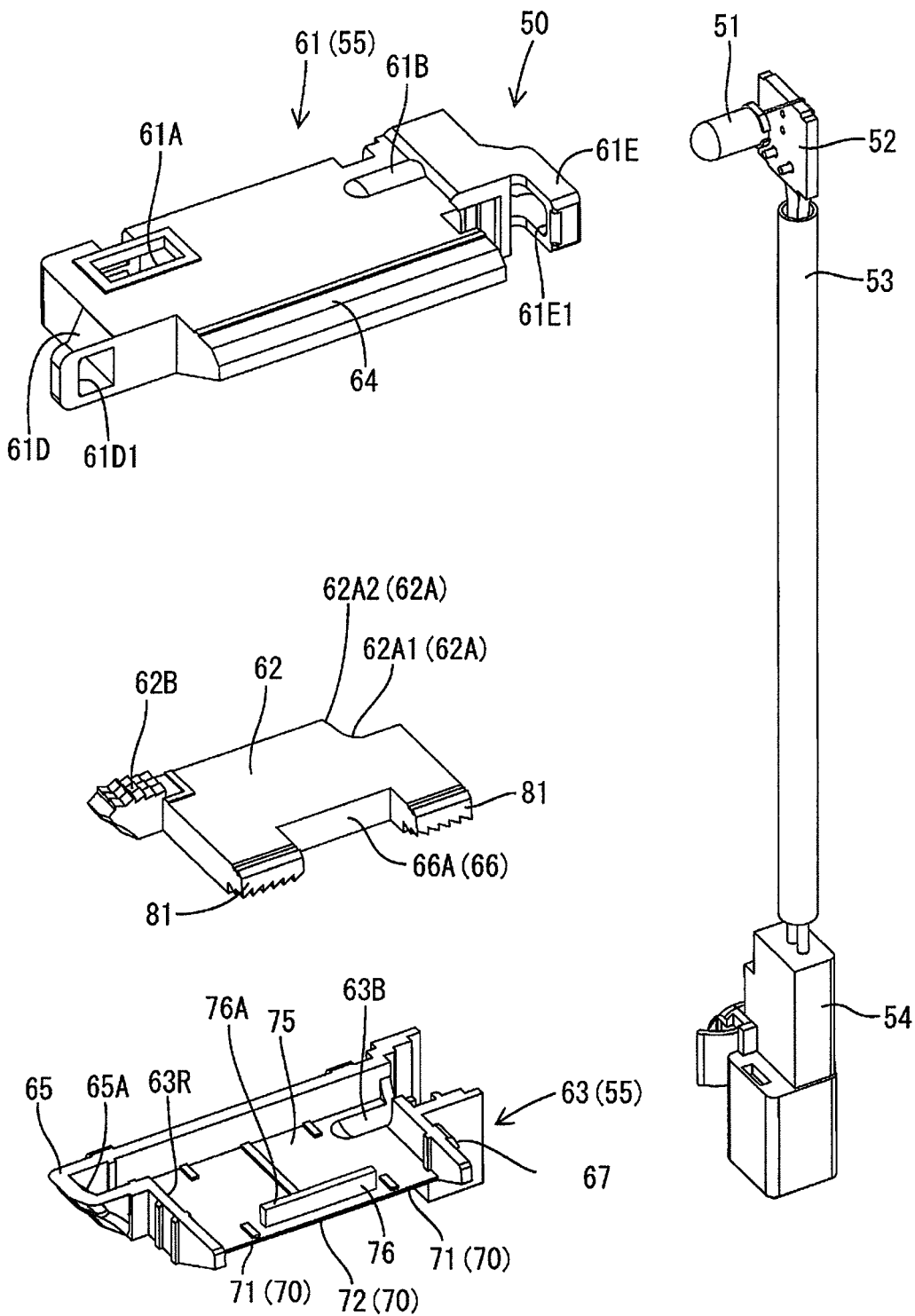
FIG. 6 is an exploded perspective view of the light source unit for a vehicle in FIG. 3.

Next, a configuration of the light source unit 50 will be explained. As illustrated in FIG. 3, the light source unit 50 of the present embodiment is mounted to the bezel 32 (a part of the vehicular interior part) so as to be positioned on a lower side of the bezel lower wall portion 32A and face the switch base 16 (a portion of a vehicle that is to be illuminated). As illustrated in FIGS. 5 and 6, the light source unit 50 includes an LED 51 (a light source body), a lens portion 62 (a light guide member), and a cover member 55 that houses the LED 51 and the lens portion 62. The cover member 55 includes an upper cover 61 and a lower cover 63.

Figure 7:
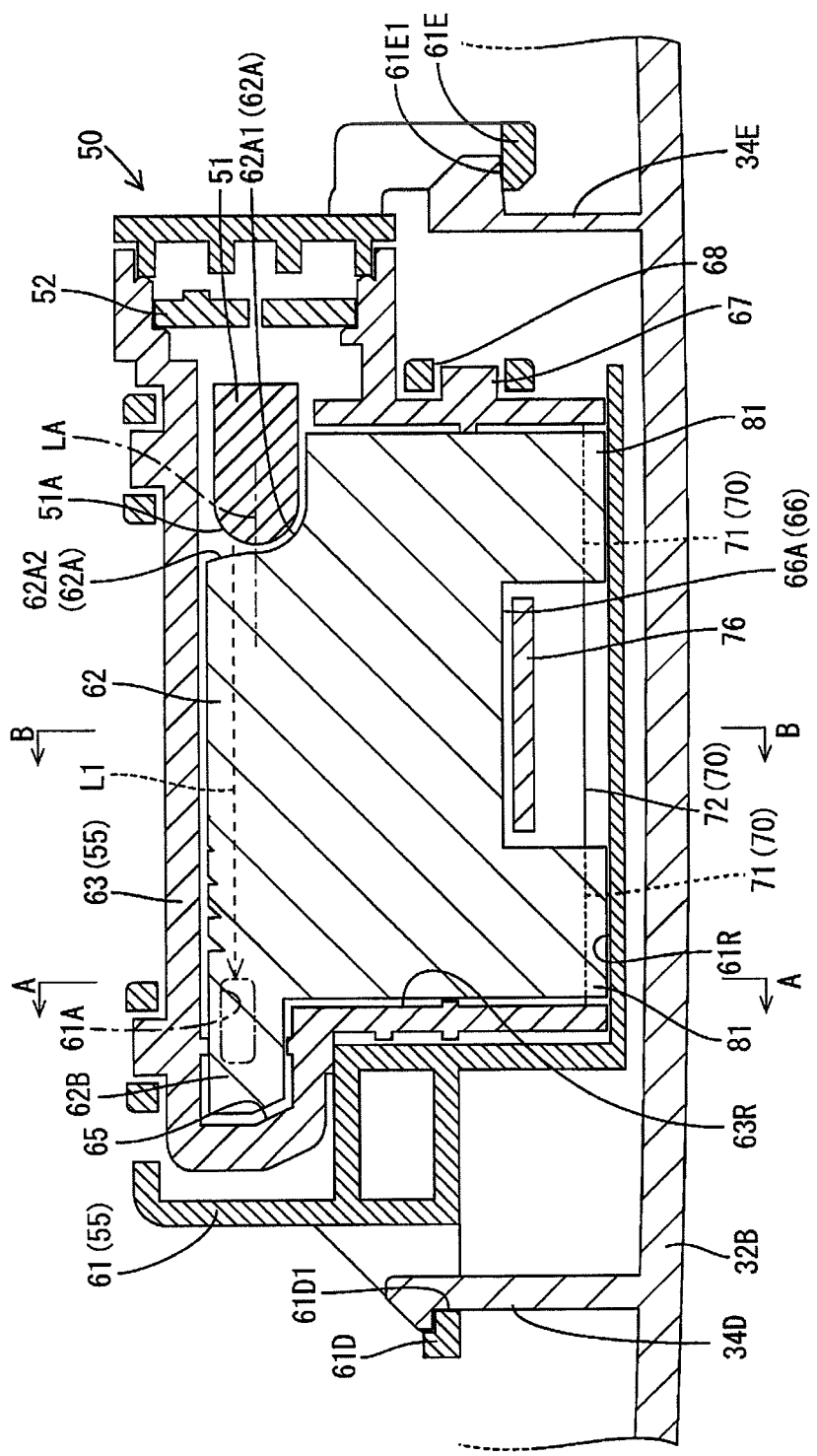
FIG. 7 is a cross-sectional view of the light source unit for a vehicle taken along a C-C line in FIG. 4.

As illustrated in FIG. 7, the LED 51 is arranged such that its light axis LA is parallel to the vehicle front-and-rear direction (the right-and-left direction in FIG. 7). The light emitted from the LED 51 (a light emitting surface 51A) is radiated three-dimensionally from the light axis LA within a certain angular range. The light emission intensity of the light emitted from the LED 51 is extremely strong along the light axis LA and tends to be lower as the inclination angle with respect to the light axis LA increases.

The lens portion 62 is formed in substantially a rectangular shape with a front view and made of synthetic resin having a high transmission property (high transparency) such as acrylic. As illustrated in FIG. 7, a corner of the lens portion 52 that is close to the LED 51 is cut out to form a light entrance surface 62A having a curved surface.

The LED 51 is arranged such that the light emitting surface 51A faces the light entrance surface 62A of the lens portion 62. Accordingly, the light from the LED 51 enters the light entrance surface 62A. The lens portion 62 guides light entering from the light entrance surface 62A toward the inside handle housing portion 30 and toward the switch base 16.

The upper cover 61 (a second cover member) and the lower cover 63 (a first cover member) are made of synthetic resin, for example. The upper cover 61 and the lower cover 63 house the LED 51 and the lens portion 62 therein with covering them from the upper and lower sides. As illustrated in FIGS. 6 and 7, for example, a projection piece 67 formed on the lower cover 63 is coupled to a coupling groove 68 formed on the upper cover 61. Accordingly, the upper cover 61 is mounted to the lower cover 63.

As illustrated in FIG. 6, each of the upper cover 61 and the lower cover 63 has a recess 61B, 63B on its inner surface. The LED 51 is fitted to and housed in the recesses 61B, 63B.

As illustrated in FIG. 7, an extended portion 61D, 61E is formed on either end of the upper cover 61 in the vehicle front-and-rear direction (in the right-and-left direction in FIG. 7). A mounting hole 61D1, 61E1 is formed in each of the extended portions 61D, 61E. The mounting holes 61D1, 61E1 are through holes. The extended portion 32 of the bezel 32 has mounting pieces 34D, 34E (stopper members) that extend to the outer side of the vehicle compartment (upwardly in FIG. 7). Each of the mounting pieces 34D, 34E is coupled to the corresponding mounting hole 61D1, 61E1 and accordingly, the light source unit 50 is mounted to (held by) the mounting pieces 34D, 34E (the bezel 32).

An inner surface 61R of the upper cover 61 and an inner surface 63R of the lower cover 63 are light reflection surfaces that reflect light. This improves use efficiency of light that is emitted from the LED 51. To form such light reflection surfaces, for example, the upper cover 61 and the lower cover 63 may be formed from a material of a color having excellent light reflectivity (such as white). The inner surfaces of the upper cover 61 and the lower cover 63 may be coated with a paint having excellent light reflectivity (for example, a white paint) to form light reflection surfaces.

A part of the light emitted from the LED 51 and enters inside of the lens portion 62 is guided through the lens portion 62. Then, the light is exited upwardly (toward the inside handle housing portion 30) from an upper light exit portion 62B that is provided on the vehicle rear side (the left side in FIG. 7) from the lens portion 62. As illustrated in FIG. 7, on the light entrance surface 62A, a curved surface 62A2 that is close to the upper light exit portion 62B has a curvature smaller than a curved surface 62A1 and the light exited from the LED 51 (represented by an arrow L1 in FIG. 7) is directed straight toward the upper light exit portion 62B.

As illustrated in FIG. 7, a projected wall portion 65 is provided on an end portion of the lower cover 63 that is opposite to the end portion in which the LED 51 is provided. The projected wall portion 65 is projected to the vehicle rear side. The projected wall portion 65 is provided on a same line as the light axis LA of light from the LED 51 with a plan view. The upper light exit portion 62B of the lens portion 62 is housed in a space surrounded by the projected wall portion 65.

As illustrated in FIG. 6, a bottom surface 65A of the projected wall portion 65 is formed to be inclined upwardly to the vehicle rear side (so as to be far away from the LED 51). Accordingly, the light that reaches the bottom surface 65A of the projected wall portion 65 is reflected upwardly.

As illustrated in FIGS. 3 and 5, an upper through hole 61A is formed in the upper cover 61 so as to correspond to the light exit hole 32E of the bezel 32. The upper through hole 61A is formed to correspond to the upper light exit portion 62B of the lens portion 62 with a plan view and the upper light exit portion 62B is exposed from the upper through hole 61A.

With the above configuration, a part of the light emitted from the LED 51 and enters the lens portion 62 reaches the upper light exit portion 62B and is exited upwardly from the upper light exit portion 62B. Then, as illustrated in FIG. 3, the light exited from the upper light exit portion 62B (represented by the arrow L1 in FIG. 3) passes through the light exit hole 32E and is exited to the inside handle housing portion 30. Accordingly, the light source unit 50 illuminates the inside of the inside handle housing portion 30.

As illustrated in FIG. 6, an upper surface (a light exit surface) of the upper light exit portion 62B is formed to have substantially a triangle wave form. With such a configuration, the light exited from the upper light exit portion 62B to outside of the lens portion 62 is refracted to control a light path. The surface shape of the upper light exit portion 62B is not limited to the triangle wave form but may be altered if necessary.

A part of the light exited from the LED 51 and entering the lens portion 62 is guided through the lens portion 62 and exited downwardly (toward the switch base 16) from a side end portion of the lens portion 62 that is close to the inner side of the vehicle compartment.

Figure 4:
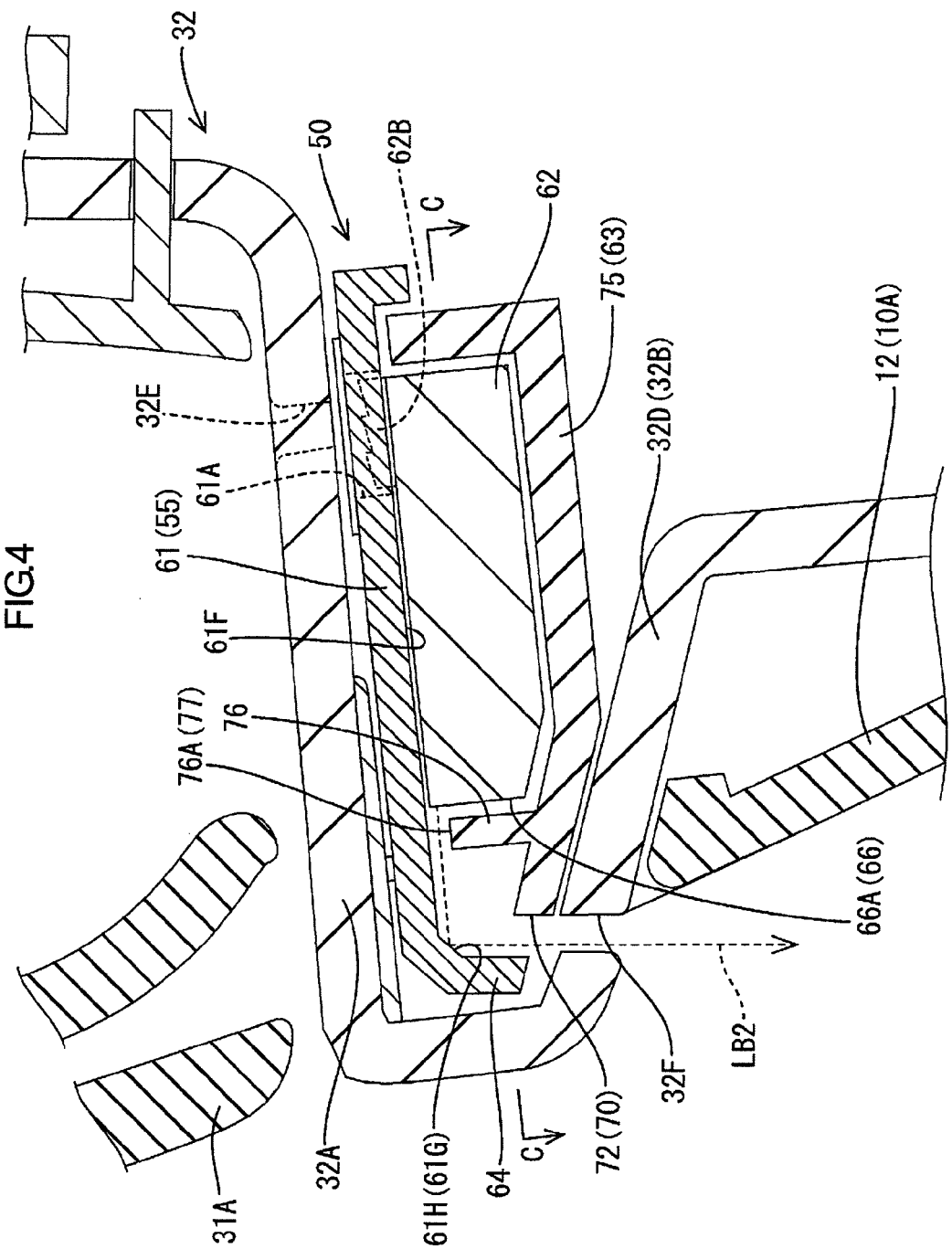
FIG. 4 is a cross-sectional view of the light source unit for a vehicle taken along a B-B line in FIG. 7.

As illustrated in FIG. 6, an end portion of a bottom wall 75 of the lower cover 63 that is close to the inner side of the vehicle compartment is cut out. Accordingly, as illustrated in FIGS. 3 and 4, a gap is formed between the end portion of the bottom wall 75 of the lower cover 63 that is close to the inner side of the vehicle compartment and a distal end wall portion 64 of the upper cover. The gap is formed to correspond to the light exit hole 32F of the bezel 32. The gap is a lower light exit portion 70 (a light exit portion) through which light is exited toward the switch base 16. As illustrated in FIG. 7, the lower light exit portion 70 is formed in an elongated shape so as to extend in the vehicle front-and-rear direction. The lower light exit portion 70 is formed by cutting out an end portion of the bottom wall 75 of the lower cover 63 that is close to the inner side of the vehicle compartment. Therefore, it can be said that the lower light exit portion 70 is provided on the lower cover 63.

As illustrated in FIG. 7, the curved surface 62A1 of the light entrance surface 62A that is close to the lower light exit portion 70 is shaped such that the light exited from the LED 51 is diffused to a wide range. Accordingly, the light exited from the LED 51 and passes through the curved surface 62A1 is diffused in a wide range. Therefore, the light reaches an entire length area of the elongated lower light exit portion 70. In the light source unit 50, the light is exited downwardly from the lower light exit portion 70. Accordingly, the light source unit 50 illuminates the switch base 16 with a wide range in its extending direction (the elongated direction, the vehicle front-and-rear direction).

A side end portion of the lens portion 62 that is close to the inner side of the vehicle compartment includes a recess 66. The recess 66 is formed in a middle portion of the side end portion in the vehicle front-and-rear direction (the right-and-left direction in FIG. 7). The recess 66 is formed to be recessed to the outer side of the vehicle compartment (upward in FIG. 7). Accordingly, the lens portion 62 is formed to correspond to each end portion of the lower light exit portion 70 in the vehicle front-and-rear direction and not to correspond to a middle portion of the lower light exit portion 70 in the vehicle front-and-rear direction.

In the following, an end portion of the lower light exit portion 70 in the vehicle front-and-rear direction (a portion that corresponds to the lens portion 62 with a plan view) is referred to as a light exit end portion 71 (a first light exit portion) and a middle portion of the lower light exit portion 70 in the vehicle front- and rear direction (a portion that does not correspond to the lens portion 62) is referred to as a light exit middle portion 72 (a second light exit portion). Two light exit end portions 71 are arranged in the longitudinal direction of the lower light exit portion 70 and the light exit middle portion 72 is provided between the adjacent two light exit end portions 71.

As illustrated in FIGS. 3 and 7, the light exit end portion 71 is provided on a lower side of the side end portion (a lens portion end portion 81) of the lens portion 62 in the vehicle front-and-rear direction. The lens portion 62 (the lens portion end portions 81) is arranged to overlap the light exit end portions 71 in the up-and-down direction in FIG. 3 (in a direction in which the light is exited from the lower light exit portion 70 toward the switch base 16). Accordingly, the light exited from the lens portion end portions 18 of the lens portion 62 through the light exit end portions 71 (represented by the arrows LB1 in FIGS. 3 and 8) directly reaches the switch base 16. In FIG. 8, a part of the bezel 32 is cut out and the lower light exit portion 70 (the end portion of the bottom wall 75 of the lower cover 63 that is close to the inner side of the vehicle compartment and forms the lower light exit portion 70) is illustrated.

The lens portion 62 and the light exit middle portion 72 do not overlap with each other in the up-and-down direction in FIG. 4 (in a direction in which the light is exited from the lower light exit portion 70 toward the switch base 16). Accordingly, the light exited from the lens portion 62 (represented by arrows LB2 in FIGS. 4 and 8) indirectly reaches the stitch base 16 through the light exit middle portion 72. The indirect reaching of light means that the light exited from the lens portion 62 is reflected by other parts (such as the inner surface of the upper cover 61) and indirectly reaches the switch base 16 (via other parts), as illustrated by the arrow LB2 in FIG. 4.

As illustrated in FIGS. 4 and 6, a lifted wall 76 is provided on the bottom wall 75 of the lower cover 63 (at least one of the first cover member and the second cover member) so as to extend toward the upper cover 61. The lifted wall 76 extends in the vehicle front-and-rear direction and is provided to cover the rear surface 66A of the recess 66 from the inner side of the vehicle compartment. The lifted wall 76 (a light blocking portion) is provided between the light exit middle portion 72 and the lens portion 62 and blocks the light that directly reaches the light exit middle portion 72 from the lens portion 62.

An upper end surface 76A of the lifted wall 76 is arranged to face a lower surface 61F of the upper cover 61 with a certain gap therebetween. The gap forms a communication portion 77 between the upper end surface 76A of the lifted wall 76 and the lower surface 61F of the upper cover 61. The communication portion 77 guides (passes) the light exited from the lens portion 62 therethrough toward the light exit middle portion 72.

As illustrated in FIG. 4, a part of a facing surface 61G of the distal end wall portion 64 of the upper cover 61 that faces the light exit middle portion 72 is an inclined surface 61H that is inclined downwardly toward the inner side of the vehicle compartment (so as to be far away from the lens portion 62). As described before, the inner surface 61R of the upper cover 61 (including the inclined surface 61H) is a light reflection surface that reflects light.

The light that is guided from the lens portion 62 toward the light exit middle portion 72 via the communication portion 77 and reaches the inclined surface 61H (represented by the arrow LB2 in FIG. 4) is reflected by the inclined surface 61H toward the light exit middle portion 72. A light guide portion (the inclined surface 61H) is provided on a facing surface 61G so as to guide the light that is guided toward the light exit middle portion 72 via the communication portion 77 to the light exit middle portion 72.

Next, advantageous effects of the present embodiment will be explained. In the present embodiment, the light exited from the lens portion 62 indirectly reaches the switch base 16 via the light exit middle portion 72. Therefore, the amount of light exited from the light exit middle portion 72 to the switch base 16 (represented by the arrow LB2 in FIG. 8) can be decreased to be smaller than the amount of light exited from the light exit end portions 71 to the switch base 16 (represented by the arrows LB1 in FIG. 8, the light directly reaches the switch base 16 from the lens portion 62).

The light exited from the middle portion of the lens portion 62 in the vehicle front-and-rear direction is directed to the portion of the switch base 16 that faces the middle portion of the lens portion 62 in the vehicle front-and-rear direction. Additionally, the portion of the switch base 16 is likely to receive the light exited from the two end portions of the lens portion 62 in the vehicle front-and-rear direction. If three light exit end portions 71 are continuously formed along the longitudinal direction of the lower light exit portion 70, that is, no recess 66 is formed in the lens portion 52, the portion of the switch base 16 that faces the middle portion of the lens portion 62 in the vehicle front-and-rear direction is likely to receive relatively a greater amount of light and this is likely to cause brightness unevenness.

In the present embodiment, the light exit middle portion 72 that receives a smaller amount of light is provided between the two adjacent light exit end portions 71 and the recess 66 is formed in the lens portion 62. This unifies the amount of light that is exited from the lower light exit portion 70 toward the switch base 16 in the longitudinal direction of the lower light exit portion 70.

In the present embodiment, the LED 51 and the lens portion 62 are housed in the cover member 55 and they are configured as a unit. This makes the light source unit 50 easy to be handled and it can be assembled to the vehicular door trim 10 easily.

In the present embodiment, the lens portion 62 (the lens portion end portions 81) is provided to correspond to the light exit end portions 71 in the up-and-down direction in FIG. 3 (in the direction in which the light is exited through the lower light exit portion 70 toward the switch base 16). Also, the lens portion 62 does not correspond to the light exit middle portion 72 in the up-and-down direction in FIG. 4 (in the direction in which the light is exited through the lower light exit portion 70 toward the switch base 16). The lifted wall 76 is provided between the light exit middle portion 72 and the lens portion 62. The lifted wall 76 blocks light that directly reaches the space in the light exit middle portion 72 from the lens portion 62.

The lens portion 62 is provided not to correspond to the light exit middle portion 72 in the direction in which the light exited through the lower light exit portion 70 toward the switch base 16. This restricts the light exited from the lens portion 62 from directly reaching the switch base 16 via the light exit middle portion 72. In other words, the light exited from the light exit middle portion 72 indirectly reaches the switch base 16.

The lifted wall 76 is provided between the lens portion 62 and the light exit middle portion 72. This surely restricts the light exited from the lens portion 62 from directly reaching the light exit middle portion 72. Therefore, the light does not directly reach the switch base 16 through the light exit middle portion 72.

The cover member 55 includes the lower cover 63 and the upper cover 61. The lower cover 63 has the lower light exit portion 70 and the upper cover 61 has the facing surface 61G that faces the lower light exit portion 70. The communication portion 77 provided to the lifted wall 76. Specifically, the communication portion 77 is formed between the upper end surface 76A of the lifted wall 76 and the lower surface 61F of the upper cover 61. The communication portion 77 guides the light exited from the lens portion 62 toward the light exit middle portion 72.

The lifted wall 76 blocks the light that is exited from the lens portion 62 and the light does not directly reach the light exit middle portion 72. The communication portion 77 guides a part of the light exited from the lens portion 62 and directed toward the light exit middle portion 72 toward the light exit middle portion 72. Accordingly, the light exited from the lens portion 62 does not directly reach the light exit middle portion 72 and also the light exited from the portion 62 and directed toward the light exit middle portion 72 is not completely blocked. This ensures the amount of light that is exited from the light exit middle portion 72.

With the configuration of the present embodiment, if the height of the lifted wall 76 is altered in designing, the width of the communication portion 77 is changed. This easily controls the amount of light exited from the lens portion 62 toward the light exit middle portion 72.

The lifted wall 76 is provided on the lower cover 63 and the inclined surface 61H (a light guide) is formed on the facing surface 61G of the upper cover 61. The light that is guided to the light exit middle portion 72 via the communication portion 77 is reflected (guided) by the inclined surface 61H and directed toward the light exit middle portion 72.

The light guided through the communication portion 77 is guided to the light exit middle portion 72 by the inclined surface 61H. Accordingly, the light exited from the lens portion 62 indirectly reaches the switch base 16 from the light exit middle portion 72.

The vehicular door trim 10 of the present embodiment includes the light source unit 50, the mounting pieces 34D, 34E (a stopper member), and the bezel lower light exit hole 32F. The light source unit 50 is held by the mounting pieces 34D, 34E. The lower light exit hole 32F is provided to face the switch base 16 (the portion that is to be illuminated) and the light exited from the lower light exit portion 70 reaches the switch base 16 through the lower light exit hole 32F.

According to the present embodiment, the light source unit 50 is held by the mounting pieces 34D, 34E of the vehicular door trim 10 such that the light exited from the lower light exit portion 70 of the light source unit 50 is guided to the lower light exit hole 32F of the vehicular door trim 10 (or such that the lower light exit hole 32F corresponds to the switch base 16). This restricts occurrence of uneven brightness on the switch base 16. Therefore, a special processing for restricting occurrence of uneven brightness is not required to be made to the vehicular door trim 10. The special processing may include, for example, providing a lens or a louver (means for adjusting a brightness distribution of the light exited from the light source unit 50) so as to cover the lower light exit hole 32F.

Other Embodiments

The present invention is not limited to the embodiments as described above with reference to the drawings. For example, the present invention may include following embodiments.

(1) The light source unit 50 is not necessarily arranged on the vehicular door trim 10 but may be arranged on any other portion. In the present embodiment, the vehicular door trim 10 is an example of a vehicular internal part in which the light source unit 50 is arranged. However, the vehicular interior part may be a pillar garnish, an instrument panel, a luggage trim, a roof head lining or the like. The portion that is to be illuminated in a vehicle is not limited to the switch base 16. For example, other than the switch base 16, the portion that is to be illuminated by the light source unit 50 arranged on the vehicular door trim 10 may be a door pocket, an inside handle (and a space in which the inside handle is housed) or the like. The portion that is to be illuminated by the light source unit 50 arranged on the instrument panel may be a glove compartment, an operation panel, a vehicular floor or the like. The portion that is to be illuminated by the light source unit 50 arranged on the roof head lining may be a base body of the roof head lining, an overhead console, a center floor console (shift lever knob) or the like.

(2) In the present embodiment, the light source unit 50 is configured to illuminate the inside handle housing portion 30 and the switch base 16. However, it is not limited thereto. For example, the light source unit 50 may be configured to illuminate only the switch base 16.

(3) The light exit portion (the lower light exit portion 70) through which the light from the light source unit 50 is exited to the switch base 16 may be provided on the upper cover 61. The light exit portion is provided on any portion as long as it is provided on the cover member 55. The lower light exit portion 70 may be formed by penetrating through a part of the cover member 55.

(4) In the present embodiment, the recess 66 is formed on only one portion of the lens portion 62 and accordingly, the lower light exit portion 70 is configured by the two light exit end portions 71 (the first light exit portions) and one light exit middle portion 72 (the second light exit portion) that is provided between the two light exit end portions 71. However, it is not limited thereto. For example, a plurality of recesses 66 may be formed in a plurality of portions of the lens portion 62. A plurality of second light exit portions (portions that can be indirectly illuminated) may be arranged along an extending direction of the lower light exit portion 70 and a plurality of first light exit portions (portions that can be directly illuminated) may be arranged on two end sides of each second light exit portion.

(5) The light exit end portion 71 is an example of the first light exit portion and the light exit middle portion 72 is an example of the second light exit portion. However, the light exit portion and the second light exit portion may not necessarily formed in a hole and but may be formed in a different manner. For example, a transparent member through which light directly reaches the switch base 16 may be used as the first light exit portion.

(6) In the present embodiment, the lifted wall 76 is used as the light blocking member. However, it is not limited thereto. The light blocking member may be any member as long as it can block the light that directly reaches the light exit middle portion 72 from the lens portion 62. For example, a member having a light blocking property may be provided on a part of the rear surface 66A of the recess 66 of the lens portion 62 so as to block a part of the light exited from the rear surface 66A.

(7) The lifted wall 76 may be provided on at least one of the upper cover 61 and the lower cover 63. The light blocking member such as the lifted wall 76 may not be provided.

(8) In the present embodiment, the communication portion 77 is formed by providing a certain gap between the upper end surface 76A of the lifted wall 76 and the lower surface 61F of the upper cover 61. However, it is not limited thereto. For example, the communication portion 77 may be configured to guide the light exited from the lens portion 62 through to the light exit middle portion 72 like the present embodiment or may be configured by a optical fiber to guide the light exited from the lens portion 62 to the light exit middle portion 72. The communication portion 77 may be configured by forming a through hole in the lifted wall 76 to guide the lens exited from the lens portion 62 through to the light exit middle portion 72.

(9) The light guide member that guides the light emitted from the LED 51 toward the switch base 16 may be any other member than the lens portion 62. For example, a prism may be used as the light guide member. The light emitted from the LED 51 may be refracted by the prism to be directed toward the switch base 16. An optical fiber or a light guide plate may be used as the light guide member. Total reflection of light is repeated in the optical fiber or the light guide plate to guide light from the LED 51 toward the switch base 16.

(10) In the present embodiment, the cover member 55 is configured by separate members such as the upper cover 61 and the lower cover 63. However, it is not limited thereto. The cover member 55 may be formed integrally from one part.

(11) In the present embodiment, the mounting pieces 34D, 34E are used as the stopper member that holds the light source unit 50. However, the stopper member is not limited thereto. A configuration of the stopper member may be altered if necessary. For example, a mounting boss or a screw may be used as the stopper member.

(12) In the present embodiment, the bezel lower light exit hole 32F is used as the illumination portion. However, the illumination portion is not limited thereto. The illumination portion may be configured in any form as long as it enables the light exited from the light exit portion to be exited to the portion to be illuminated. For example, a transparent member that transmits light therethrough may be used as the illumination portion.

The embodiments of the present invention have been described, however, the present invention is not limited to the above embodiments explained in the above description and the drawings. The technology described herein includes various modifications of the above embodiments.

Elements of technology described in this specification or illustrated in the drawings exert technical utility by each or a combination thereof. The elements of technology should not be limited to the combinations of the elements claimed in the original patent application. The technology described in this specification or illustrated in the drawings is provided for achieving multiple objectives at the same time. The technical utility of the technology is exerted when at least one of the objectives is achieved.

The invention claimed is:

1. A light source unit for a vehicle illuminating a portion of the vehicle, the light source unit comprising:
    a light source body;
    a light guide member having a light entrance portion and a light exit portion, the light entrance portion which light from the light source body enters and the light exit portion which the light entering the light entrance portion and guided within the light guide member exits toward the portion of the vehicle that is to be illuminated; and
    a cover member configured to house the light source body and the light guide member, the cover member having an elongated light exit portion through which light exiting the light exit portion of the light guide member exits to the portion that is to be illuminated, wherein:
    the elongated light exit portion includes at least two first light exit portions that are arranged along a longitudinal direction of the elongated light exit portion, and
    a second light exit portion provided between the at least two first light exit portions,
    the at least two first light exit portions and the second light exit portion are continuous to each other and configure the elongated light exit portion,
    each of the first light exit portions overlaps the light exit portion of the light guide member in a direction in which the light exits the elongated light exit portion to the portion to be illuminated, the second light exit portion does not overlap the light exit portion of the light guide member in the direction in which the light exits the elongated light exit portion, and the light exiting the light exit portion of the light guide member exits through the at least two first light exit portions and the second light exit portion that are continuous to each other.

2. The light source unit according to claim 1, further comprising a light blocking member provided between the second light exit portion and the light guide member and configured to block light exiting the light exit portion of the light guide member toward the second light exit portion.

3. The light source unit according to claim 1, further comprising;
in combination, a vehicular interior part;
a stopper member configured to hold the light source unit; and
an illumination portion provided to face the portion to be illuminated and through which the light exiting the elongated light exit portion reaches the portion to be illuminated.

4. The light source unit according to claim 3, wherein the portion to be illuminated is a switch base.

5. The vehicular interior part according to claim 3, further comprising:
an inside handle housing portion, the inside handle housing portion including a bezel and an inside handle housed in the bezel, the bezel including the stopper member.

6. The light guide unit according to claim 1, wherein the elongated light exit portion comprises a gap in the cover member.

7. The light guide unit according to claim 6, wherein
the cover member includes a first cover member and a second cover member,
the light guide member is arranged between the first cover member and the second cover member, and
the gap is formed between corresponding ends of the first cover member and the second cover member.

8. The light source unit according to claim 1, wherein the cover member has an inner surface that is light reflective.

9. The light source unit according to claim 1, wherein the light exiting the light exit portion of the light guide member directly reaches the portion to be illuminated via the first light exit portions and the light exiting the light exit portion of the light guide member indirectly reaches the portion to be illuminated via the second light exit portion.

10. The light source unit according to claim 1, wherein the light guide member extends along the longitudinal direction of the elongated light exit portion from a first one of the at the two first light exit portions to a second one of the at least two first light exit portions.

11. A light source unit for a vehicle illuminating a portion of the vehicle, the light source unit comprising:
a light source body;
a light guide member having a light entrance portion and a light exit portion, the light entrance portion which light from the light source body enters and the light exit portion which the light entering the light entrance portion and guided within the light guide member exits toward the portion of the vehicle that is to be illuminated; and
a cover member configured to house the light source body and the light guide member, the cover member having an elongated light exit portion through which light exiting the light exit portion of the light guide member exits to the portion that is to be illuminated, wherein:
the elongated light exit portion includes at least two first light exit portions that are arranged along a longitudinal direction of the elongated light exit portion; and
a second light exit portion provided between the two first light exit portions,
each of the first light exit portions overlaps the light exit portion of the light guide member in a direction in which the light exits the elongated light exit portion to the portion to be illuminated, and
the second light exit portion does not overlap the light exit portion of the light guide member in the direction in which the light exits the elongated light exit portion, and
a light blocking member provided between the second light exit portion and the light guide member and configured to block light exiting the light exit portion of the light guide member toward the second light exit portion, wherein:
the cover member includes a first cover member and a second cover member, and the first cover member has the elongated light exit portion and the second cover member is mounted to the first cover member and has a facing surface that faces the elongated light exit portion; and
the light blocking member is provided on one of the first cover member and the second cover member and is a wall that extends from the one of the first cover member and the second cover member toward another one of the first cover and the second cover member, and the light source unit further comprising:
a communication portion provided to the wall and configured to guide light exiting from the light guide member through to the second light exit portion.

12. The light guide unit according to claim 11, further comprising a light guide provided on the facing surface and configured to guide the light exiting the light exit portion of the light guide member via the communication portion to the second light exit portion, wherein the wall is provided on the first cover member.

13. The light guide unit according to claim 12, wherein the light guide is an inclined surface.

14. The light guide unit according to claim 11, wherein the communication portion is a gap formed between the wall and the another one of the first cover member and the second cover member.

15. The light guide unit according to claim 11, further comprising another light exit portion provided on the second cover member and through which the light from the light source body exits in substantially an opposite direction from a direction in which the light from the light source body exits through the elongated light exit portion provided in the first cover.

16. A light source unit for a vehicle illuminating a portion of the vehicle, the light source unit comprising:
a light source body;
a light guide member having a light entrance portion and a light exit portion, the light entrance portion which light from the light source body enters and the light exit portion which the light entering the light entrance portion and guided within the light guide member exits toward the portion of the vehicle that is to be illuminated; and
a cover member configured to house the light source body and the light guide member, the cover member having an elongated light exit portion through which light exiting the light exit portion of the light guide member exits to the portion that is to be illuminated, wherein:

the elongated light exit portion includes at least two first light exit portions that are arranged along a longitudinal direction of the elongated light exit portion; and a second light exit portion provided between the two first light exit portions, each of the first light exit portions overlaps the light exit portion of the light guide member in a direction in which the light exits the elongated light exit portion to the portion to be illuminated, and the second light exit portion does not overlap the light exit portion of the light guide member in the direction in which the light exits the elongated light exit portion, wherein the light guide member has a recess on one end portion thereof adjacent to the elongated light exit portion, the recess corresponding to the second light exit portion, the light guide member has at least two light guide member end portions having the recess therebetween, and each of the at least two light guide member end portions includes the light exit portion overlapping each of the at least two first light exit portions.

17. The light source unit according to claim 16, wherein the recess has a recessed surface that is the light exit portion of the light guide member, the at least two light guide member end portions have surfaces facing the respective at least two first light exit portions, the surfaces being the light exit portions of the light guide member.

18. The light source unit according to claim 17, further comprising a light blocking member provided between the second light exit portion and the light guide member and in a space within the recess, and the light blocking member being configured to block light exiting the light guide member through the recessed surface.

19. The light source unit according to claim 17, wherein a distance between the recessed surface and the second light exit portion is greater than a distance between the respective surfaces of the light guide member end portions and the respective first light exit portions.

* * * * *